US010116127B1

(12) United States Patent
Lopez-Martinez et al.

(10) Patent No.: US 10,116,127 B1
(45) Date of Patent: Oct. 30, 2018

(54) JUNCTION BOXES WITH WRAP-AROUND COMPARTMENTS

(71) Applicant: Elemental LED, Inc., Reno, NV (US)

(72) Inventors: Gilberto Uriel Lopez-Martinez, Reno, NV (US); Daniel South, Dayton, NV (US); Andrew Lassen, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 16/017,588

(22) Filed: Jun. 25, 2018

Related U.S. Application Data

(60) Provisional application No. 62/620,809, filed on Jan. 23, 2018, provisional application No. 62/614,191, filed on Jan. 5, 2018, provisional application No. 62/597,541, filed on Dec. 12, 2017.

(51) Int. Cl.
*H02G 3/08* (2006.01)
*H02G 3/14* (2006.01)

(52) U.S. Cl.
CPC ............... *H02G 3/085* (2013.01); *H02G 3/14* (2013.01)

(58) Field of Classification Search
CPC .................................. H02G 3/085; H02G 3/14
See application file for complete search history.

(56) References Cited

U.S. PATENT DOCUMENTS

| 5,472,355 | A | | 12/1995 | Wittmann | |
|---|---|---|---|---|---|
| 5,594,207 | A | * | 1/1997 | Fabian | H02G 3/086 174/53 |
| 5,962,811 | A | | 10/1999 | Rodrigues et al. | |
| 6,037,541 | A | * | 3/2000 | Bartley | H01P 1/2084 174/372 |
| 6,091,023 | A | | 7/2000 | O'Donnell | |
| 8,436,259 | B2 | * | 5/2013 | Green | H02G 3/08 174/50.5 |
| 9,788,374 | B1 | * | 10/2017 | Holleschau | H05B 33/0815 |
| 9,951,934 | B2 | | 4/2018 | Buck et al. | |
| 2003/0056964 | A1 | | 3/2003 | Lalancette et al. | |

(Continued)

FOREIGN PATENT DOCUMENTS

| DE | 19501339 C1 | 8/1996 |
|---|---|---|
| WO | WO1998023015 A1 | 5/1998 |

OTHER PUBLICATIONS

Elemental LED, Inc. "Power Supplies, Switches, and Dimmers." 2016 Diode LED catalog, pp. 1 and 85, Jan. 2016.

(Continued)

*Primary Examiner* — Sherman Ng
(74) *Attorney, Agent, or Firm* — Andrew McAleavey

(57) ABSTRACT

Junction boxes and partitions for junction boxes are disclosed. The junction boxes have a central area for installation of a driver or another such component and at least one wrap-around compartment in which wire connections can be made. In many cases, the junction box may have two wrap-around compartments, often mirror images of one another, that provide separate spaces for high- and low-voltage wire connections. The interior walls or partitions that create the compartments may be carried by and arise from the base of a junction box, or they may be carried by a separate piece that inserts over the driver, fully encloses or caps it, and also carries partition portions to create fully-divided compartments when used in combination with a junction box base that has no partitions of its own.

20 Claims, 14 Drawing Sheets

(56) References Cited

U.S. PATENT DOCUMENTS

| | | |
|---|---|---|
| 2003/0102143 A1 | 6/2003 | Sato et al. |
| 2006/0191697 A1 | 8/2006 | Cardenas et al. |
| 2008/0105461 A1 | 5/2008 | King et al. |
| 2009/0065247 A1* | 3/2009 | Shelton ............... H05K 5/0013 174/520 |
| 2013/0258682 A1 | 10/2013 | Pino et al. |
| 2013/0319715 A1* | 12/2013 | Korcz ..................... H02G 3/14 174/50 |
| 2017/0268758 A1* | 9/2017 | Buck ....................... F21V 29/83 |

OTHER PUBLICATIONS

International Search Report and Written Opinion of the International Searching Authority for PCT/US2017/022129, filed Mar. 13, 2017. Report dated Jun. 19, 2017.

* cited by examiner

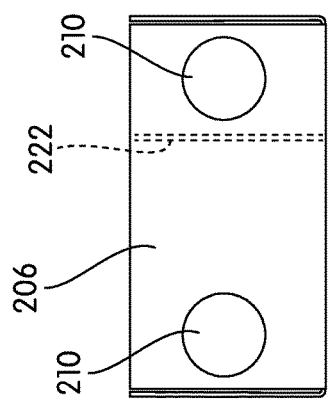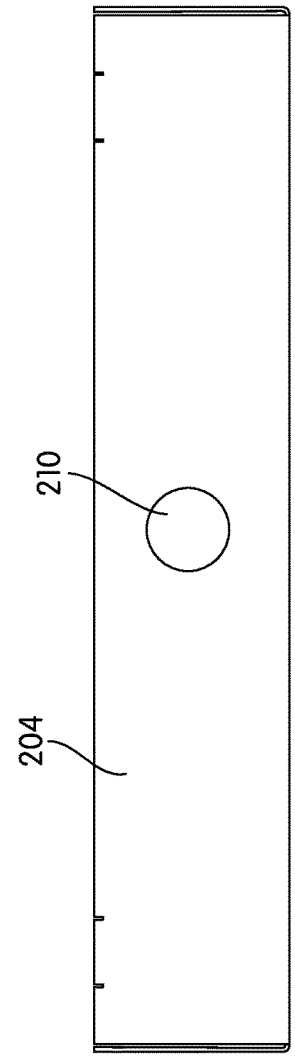

JUNCTION BOXES WITH WRAP-AROUND COMPARTMENTS

CROSS-REFERENCE TO RELATED APPLICATIONS

This patent application claims priority to U.S. Provisional Patent Application No. 62/597,541, filed Dec. 12, 2017; U.S. Provisional Patent Application No. 62/614,191, filed Jan. 5, 2018; and U.S. Provisional Patent Application No. 62/620,809, filed Jan. 23, 2018. All of those patent applications are incorporated by reference in their entirety.

BACKGROUND OF THE INVENTION

1. Field of the Invention

In general, the invention relates to junction boxes for making connections to drivers.

2. Description of Related Art

Junction boxes are enclosures that protect electrical connections, for example, from foreign matter and contaminants that could dislodge or jeopardize the connection. In case of a fire, the junction box acts as a fire enclosure that serves to contain the fire.

Junction boxes are required by building and electrical codes in many jurisdictions and, in their basic form, are familiar and age-old electrical components. Often viewed as a commodity component, most junction boxes are little more than metal or plastic boxes with holes—or knock-outs for holes. While traditional junction boxes work quite well for high-voltage connections, technology has changed, and many construction projects now use low-voltage power in addition to high-voltage.

The definition of low voltage varies depending on the source one consults, but for purposes of this description, voltages under about 50V may be considered low voltage. Low voltage power may be used for solid-state lighting (i.e., lighting based on light-emitting diodes (LEDs)), it may be used for control and automation, or it may be used for other kinds of household and commercial building systems.

Most low-voltage components require a separate driver to be installed. In broad terms, a driver is a transformer-rectifier that converts high-voltage alternating current (AC) power to low-voltage direct current (DC) power. For example, a driver may convert from 110 or 277 VAC to 12 V or 24 VDC. A typical driver has a set of high-voltage inputs and a set of low-voltage outputs. The inputs and outputs are usually in the form of wires, although terminal blocks and other structures may be used.

Regulations in at least some jurisdictions require that a driver be enclosed, and that high-voltage connections be separated from low-voltage connections. Thus, a number of manufacturers have created junction boxes that have space and mounting structures for a driver, as well as compartments to separate high- and low-voltage connections.

U.S. Pat. No. 9,951,934, which is incorporated by reference in its entirety, is the work of the present assignee and describes junction boxes that are suitable for use with a wide variety of different drivers. These junction boxes feature an open central area and two identical compartments, one on each end of the central area. The central area provides ample space and mounting structures for securing drivers, and the two compartments provide separate spaces for making high- and low-voltage connections. The presence of two identical compartments gives the junction box symmetry, so that either compartment can serve as the high-voltage compartment and either can serve as the low-voltage compartment. The junction boxes disclosed in U.S. Pat. No. 9,951,934 have a number of advantages, including ease of access and ease of driver installation.

Over the last few years, drivers have gotten considerably smaller as some manufacturers have perfected techniques for miniaturizing the necessary components. Unfortunately, junction box technology has not advanced at the same rate, and most available junction boxes are much larger than the smallest drivers. Yet making a junction box smaller is not a trivial exercise—for example, regulatory requirements may specify that the compartments for making electrical connections must have at least a certain minimum volume.

SUMMARY OF THE INVENTION

One aspect of the invention pertains to a junction box. The junction box has a base and a cover. The base has a sidewall and an internal partition or partitions that divide it into a central area, suitable for housing an AC-to-DC converter and driver, and at least one wrap-around compartment that provides a separate space for making high- or low-voltage wire connections. For example, the internal partition or partitions may divide the base of the junction box into a central area and two wrap-around compartments. Those compartments may be, e.g., U-shaped or L-shaped, and they may be mirror images of one another in some embodiments. The interior walls may have U-shaped cut-outs that allow wires to pass from the central area into the compartments, and the sidewall generally has at least one opening or knock-out per compartment that allows wires to enter and leave the junction box.

Another aspect of the invention also relates to junction boxes. Junction boxes according to this aspect of the invention have a base and a cover, but unlike the junction boxes described above, has an undivided central space and carries no internal partitions of its own. Instead, a driver cap is provided that encloses a driver on five sides. The driver cap carries partition portions that are designed to extend to the sidewall or sidewalls of the base, thereby creating at least one wrap-around compartment for making high- or low-voltage connections. A driver cap with the form of a rectangular prism may, for example, have two partition portions attached along opposite diagonal corners and arranged to extend outwardly from the driver cap.

Yet another aspect of the invention relates to partitions for junction boxes. A driver cap, as described above, may be used in some cases as a retrofit partition for a conventional junction box that was not originally designed to house an AC-to-DC driver.

Other aspects, features, and advantages of the invention will be set forth in the description that follows.

BRIEF DESCRIPTION OF THE DRAWING FIGURES

FIG. 11 is an end elevational view of the junction box of FIG. 9;

FIG. 12 is a side elevational view of the junction box of FIG. 9;

DETAILED DESCRIPTION

Figure 1:
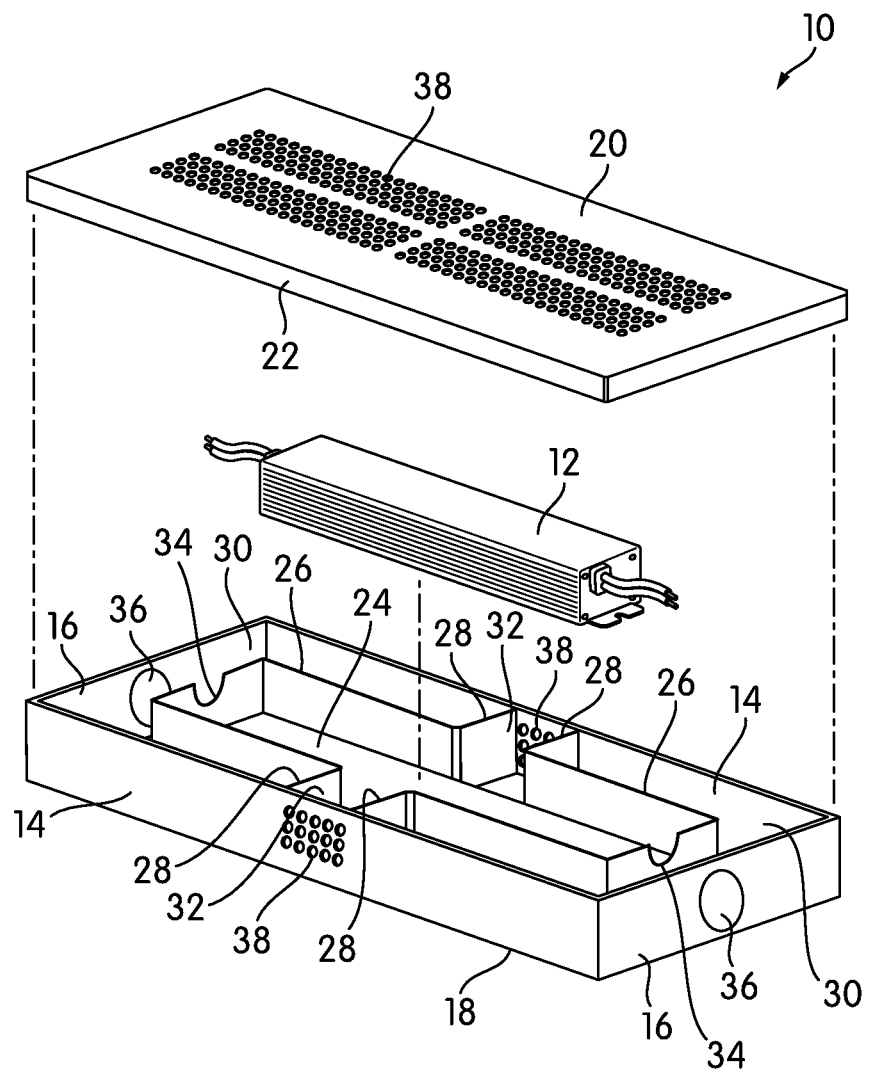
FIG. 1 is an exploded perspective view of a junction box according to one embodiment of the present invention.

FIG. 1 is an exploded perspective view of a junction box, generally indicated at 10, according to one embodiment of the invention. The junction box 10 is shown with a driver 12. As shown in FIG. 1, junction box 10 is a five-sided rectilinear enclosure with two long walls 14, two short walls 16, and a flat bottom 18. A removable cover 20 covers and closes the enclosure, giving junction box 10 the overall shape of a rectangular prism. The cover 20 of the illustrated embodiment has a depending lip 22 that extends down over the tops of the walls 14, 16 to cover any gap between the cover 20 and the walls 14, 16.

Figure 2:
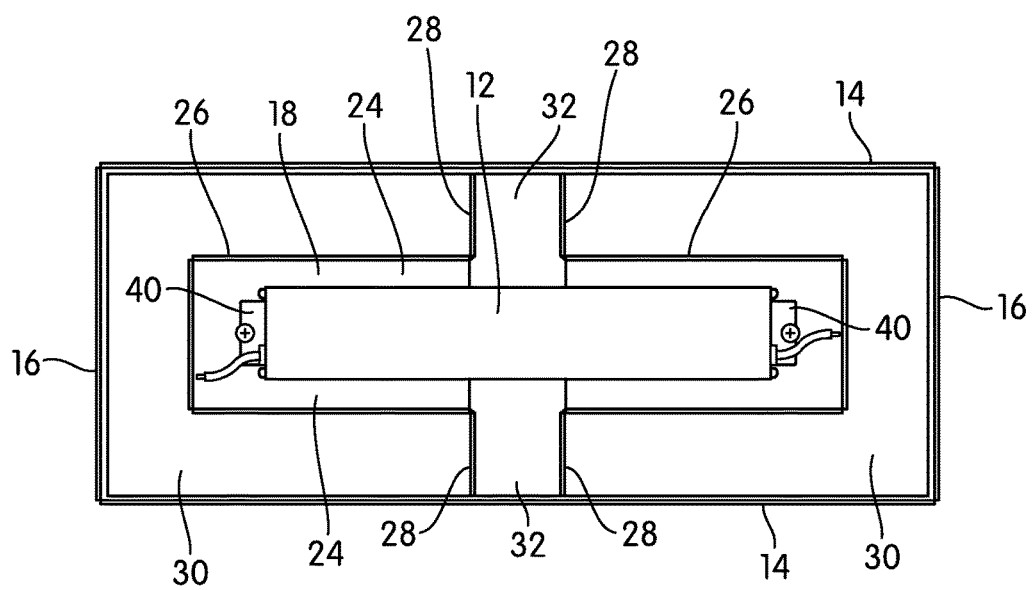
FIG. 2 is a top plan view of the junction box of FIG. 1 with the cover removed.

FIG. 2 is a top plan view of junction box 10 with the cover 20 removed. As shown in FIGS. 1 and 2, junction box 10 has a central area 24 in which the driver 12 is installed. The central area 24 is bordered by two mirror-image interior walls 26 that, in the illustrated embodiment, are generally U-shaped, with transverse portions 28 that connect with and terminate along the long sidewalls 14. The interior walls 26 divide the central area 24 from two mirror-image compartments 30 that, because of the shape of the interior walls 26, are themselves U-shaped. The compartments 30 extend around three sides of the driver 12 when it is installed in the central area 24. A transverse area 32 extends across junction box 10 between the transverse portions 28 of the interior walls 26, to provide more access to the central area 24 and more ability to manipulate the driver 12 within it.

While there are two mirror-image interior walls 26 in junction box 10 of FIG. 1, a junction box according to an embodiment of the invention may need only one compartment 30, in order to separate high voltage from low voltage. If that is the case, then only one interior wall 26 may be needed. Of course, any number of shorter walls may be connected together to form the interior wall 26.

As shown in FIG. 1, each of the interior walls 26 has a U-shaped cut out 34 along its short side nearest the short walls 16 of junction box 10. The cut-outs 34 allow an installer to pass wires from the driver 12 to the compartments 30 without having to pull wires through an opening. The cut outs 34 need not be located in the place shown in FIG. 1 in all embodiments; instead, they may be located anywhere along the interior walls 26. Some embodiments of junction box 10 may include multiple cut-outs 34 in the interior walls 26. Of course, while cut-outs 34 are advantageous in that they prevent an installer from having to pull wires through openings, some embodiments may use openings in place of cut-outs 34.

In the embodiment of FIG. 1, the locations of the interior wall cut-outs 34 are coordinated with the locations of knock-outs or openings 36 in the exterior walls 14, 16. Junction box 10 may have any number of openings or knock-outs 36 in its exterior walls 14, 16, or in the bottom 18, to allow for incoming and outgoing electrical connections, as will be described below in more detail. A knock-out 36, as the term is used here, is a pre-defined frangible portion of an exterior wall 14, 16 that can be removed, either manually or with a tool, to create an opening. Most knock-outs 36 are round and create round openings, although they may be of any shape. Some knock-outs may have multiple, individually removable frangible pieces to make either round openings of various sizes or openings of various shapes.

Figure 3:
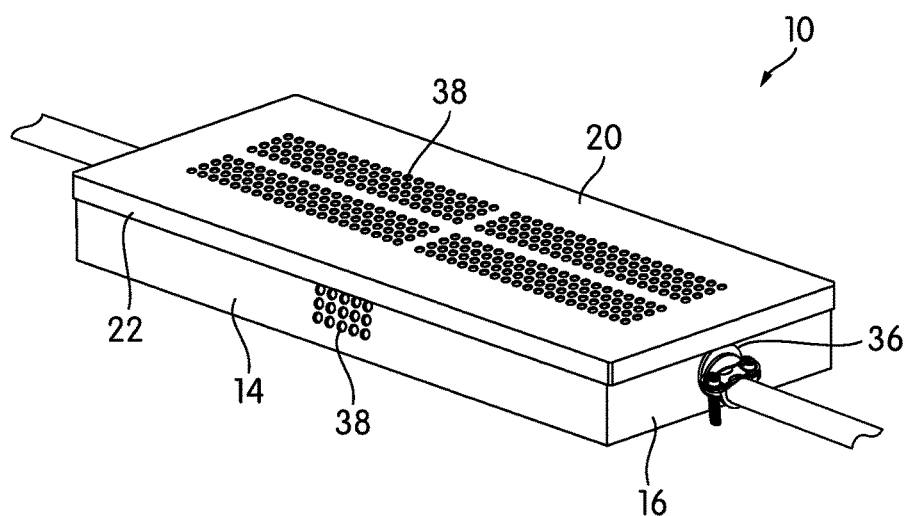
FIG. 3 is an assembled perspective view of the junction box of FIG. 1.

Junction box 10 of FIG. 1 has two knock-outs or openings 36, one opening 36 centered along each short wall 16. The cut-outs 34 in each of the interior walls 26 are directly in line with the openings 36 so that wires from the driver 12 can extend relatively straight. As shown in FIG. 3, the openings 26 allow junction box 10 to connect with, for example, type NM in-wall wire, plenum-rated wire, or metal or plastic conduit. While not shown in the figures, and not critical to the invention itself, connections between the driver 12 and the wire that exits the junction box 10 may be by twist-on wire nuts, lever nuts, or any other conventional wire connecting mechanism. In some embodiments, the driver 12 itself may include a terminal block for making wire connections.

In addition to the knock-outs or openings 36, junction boxes according to embodiments of the invention may be perforated so as to increase ventilation and decrease internal temperatures. Junction box 10 has four groups of perforation holes 38 on its cover 20, and one group of perforation holes 38 in the center of each long wall 14.

As for the driver 12 itself, any number of mechanisms may be used to secure it within the central area 24, depending on the configuration of the driver 12 and a number of other factors. U.S. Pat. No. 9,951,934 describes a number of ways in which drivers may be secured to junction boxes, and any of those methods may be implemented. In FIG. 2, the driver 12 has a flange 40, threaded rods are secured to the bottom 18, and thumbscrews or coupling nuts are secured over the flange 40 to secure the driver 12. The junction box 10 may also have mounting holes provided in the bottom 18.

In some cases, the cover 20 may act to secure the driver 12. More specifically, junction box 10 may be dimensioned such that there is only a small clearance, or no clearance, between the cover 20 and the driver 12. In that case, the cover 20 helps to hold the driver 12 in place. The cover 20 itself may be secured to the junction box 10 in any number of ways, more of which will be shown and described below.

In the embodiment of FIGS. 1-3, the cover 20 is secured by a tight fit, but it may be secured with screws or other fasteners.

Junction box 10 may be made of metal or plastic. If it is made of metal, it may be, for example, cast, machined from a block of material, or made of sheet metal. Sheet metal may be a particularly cost-effective material from which to make junction box 10. If needed for ingress protection, adjacent panels of bent sheet metal may be welded together to eliminate gaps. However, if completely seamless construction or thicker walls are needed, it may be useful to cast or machine junction box 10. It may also be useful, e.g., for corrosion protection, to protect at least the outer surfaces of junction box 10 by anodizing, galvanizing, powder coating, or some similar protection or passivation technique. In some embodiments, a material like stainless steel that is naturally resistant to corrosion and other environmental effects may be used.

Plastic versions of junction box 10 may be made, e.g., by injection molding or resin casting, to name two possible techniques. The particular plastic and the additives that are included may be chosen based on the environment in which the junction box is to be used. Suitable plastics include, but are not limited to, poly(vinyl chloride) (PVC), acrylonitrile-butadiene-styrene (ABS), and polycarbonate. The plastics in question may have to meet certain regulatory standards, e.g., as to flame rating, melting point, etc., and those standards may vary from jurisdiction to jurisdiction. As those of skill in the art will understand, virtually any plastic that can pass the necessary flame testing can be used.

Composite resin-impregnated materials may also be used. For example, resin-impregnated glass-fiber composites, carbon-fiber composites, and resin laminates may also be used. These materials are usually formed by using an oriented or woven mat of material that is impregnated with resin. In many cases, multiple layers may be used. For example, if laminated with resin and treated for flame resistance, even paper may be a suitable material. Composite plastic resins may also be used. For example, polymers filled with short or long glass fibers, short or long carbon fibers, or similar may be used. Glass-filled nylon, for example, may be suitable in some embodiments.

Thus, as is apparent from FIGS. 1-3 and the above description, in junction box 10, the two mirror-image compartments 30 "wrap around" the driver 12. The phrase "wrap around," as used here, refers to compartments that extend around at least portions of at least two sides of a driver, if the driver is rectilinear in shape. If the driver in question has a curved outer sidewall, then "wrap around" refers to a compartment with at least one wall that substantially matches the curvature of the driver sidewall, or to a compartment that geometrically circumscribes the driver. Although the compartments 30 of junction box 10 are equal in size and are mirror images of one another, neither of those things need be true in all embodiments. For example, one compartment could be substantially smaller than the other.

Although regulatory standards often require compartments of at least a minimum volume in order to make electrical connections, those standards do not usually dictate how that volume should be arranged. Wrapping compartments around the driver may prevent the junction box from getting too large in any one dimension.

Junction box 10 also has certain other advantages. For example, its symmetry may make installation easier and the junction box itself more versatile.

The U-shaped compartments of junction box 10 are only one possible shape and configuration for a junction box with wrap-around compartments. As might be appreciated from the description above, there are a number of ways that compartments might wrap around a driver, and a number of ways of defining and separating those compartments from the driver. Junction box 10 may carry partitions of other shapes.

Figure 4:
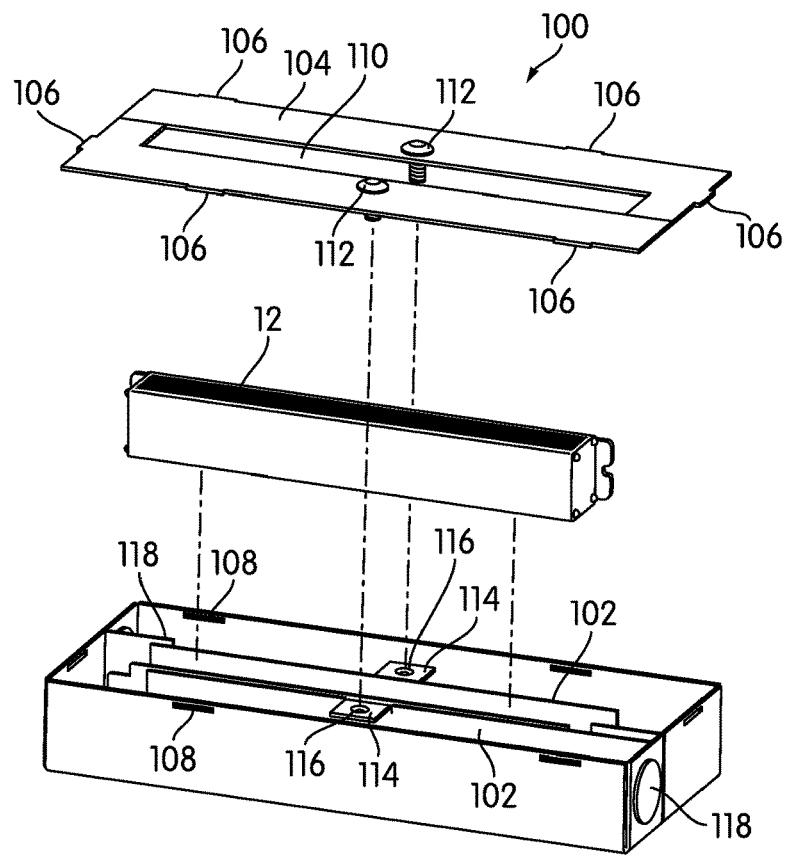
FIG. 4 is an exploded perspective view of a junction box according to another embodiment of the invention.

FIG. 4 is an exploded perspective view of a junction box 100 according to another embodiment of the invention. The junction box 100 has two L-shaped compartments 102 that wrap around the perimeter of the driver 12 and meet at opposite ends to form an enclosure that has a rectilinear shape overall. Whereas junction box 10 is a unitary, single enclosure that is internally divided into a central area 24 and two U-shaped compartments 30, the two L-shaped compartments 102 of junction box 100 are essentially separate containers that are secured together around the driver 12. (Although the driver 12 in junction box 100 is assumed to have the same characteristics as the driver 12 installed in junction box 10, that need not be the case in all embodiments.)

As shown in FIG. 4, a cover 104 extends over both compartments 102 to close junction box 100. The cover 104 is a flat, generally rectangular piece with a number of outwardly protruding tabs 106, one on each short side and two on each long side, that insert into corresponding horizontal slots 108 in the upper sidewalls of the compartments 104 to secure the cover 104 to the junction box 100.

The cover 104 of the illustrated embodiment has a rectangular open area 110 in its center, which exposes the majority of the top face of the driver 12 when the cover 104 is installed. The cover 104 also has at least two screw holes, through which screws 112 extend to secure the cover 104 to the compartments 102 of the junction box 100. As shown in FIG. 4, each compartment 102 has a horizontally-extending flange 114 with a threaded hole 116 that receives one of the screws 112.

Figure 5:
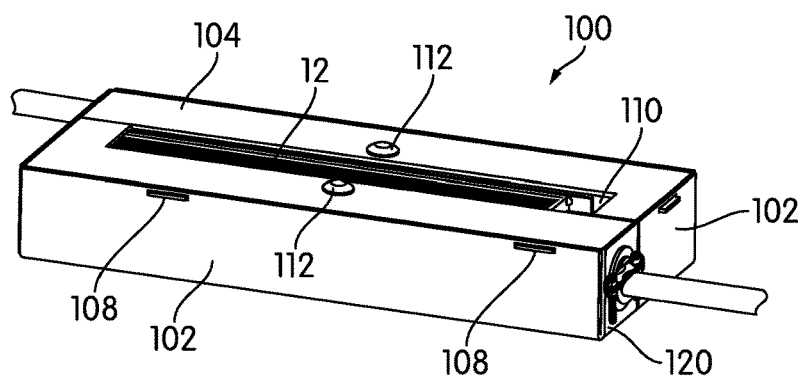
FIG. 5 is an assembled perspective view of the junction box of FIG. 4.

FIG. 5 is a perspective view of the junction box 100. As shown in FIG. 4, the short end wall of the long side of each compartment 102 has a knock-out 118 to allow wires to enter and leave the junction box 100. In FIG. 5, the knock-out 118 has been removed, leaving an opening. A clamp 120 is secured within the opening in FIG. 5. In the illustrated embodiment, the clamp 120 secures a type NM plenum-rated cable. Of course, metal conduit may be used in some applications, and any appropriate conduit or wire may be used in other applications.

Figure 6:
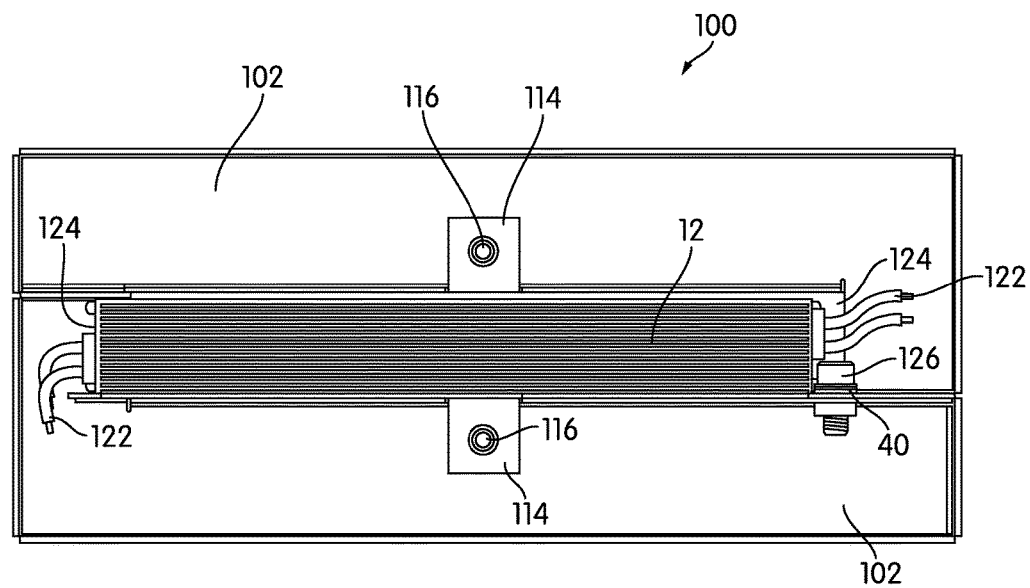
FIG. 6 is a top plan view of the junction box of FIG. 4 with the cover removed.

FIG. 6 is a top plan view of junction box 100 without its cover 120. At the respective ends of the driver 12, a single wall is missing from each compartment 102, which allows wires 122 to extend through respective openings 124 into the separate compartments 102. Instead of a missing wall, a half-wall, or a wall with an opening or cut-out may be used in other embodiments.

The two compartments 102 may be secured together in any number of ways, including welding, brazing, riveting, bolting, and other forms of fastening. In the illustration of FIG. 6, a single screw 126 is secured over the flange 40 on the driver 12, thus securing the driver, and transits the dividing wall between the two compartments 102 to secure the two compartments 102 together. The two compartments 102 may be secured by additional screws or other means over their lengths. This differs somewhat from the arrangement in the junction box 10 described above: the driver 12 is essentially mounted on its side in junction box 100.

Figure 7:
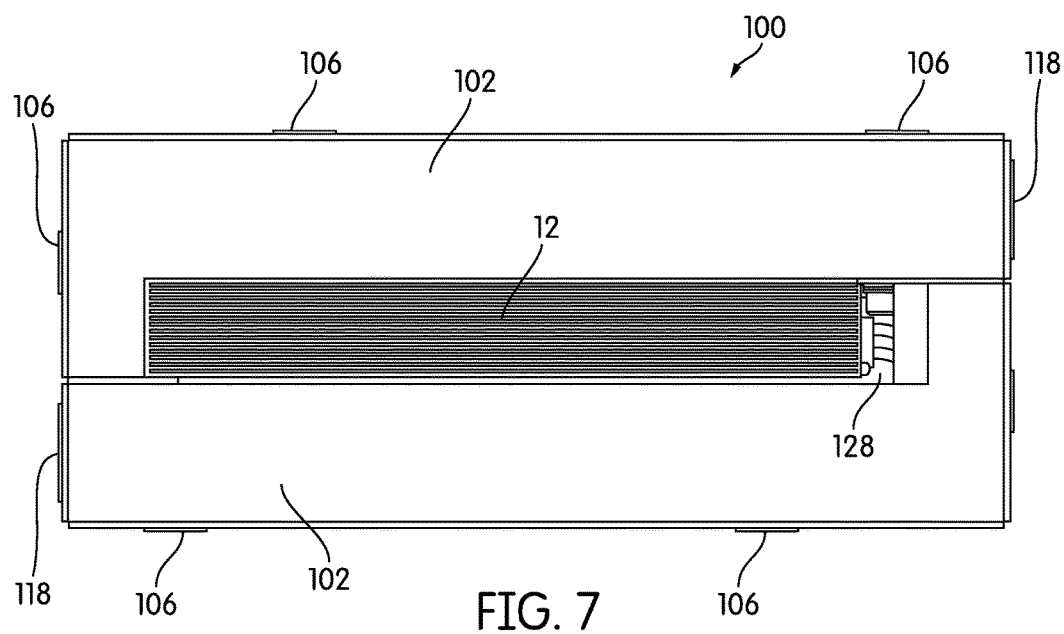
FIG. 7 is a bottom plan view of the junction box of FIG. 4.

FIG. 7 is a bottom plan view of the junction box 100. FIG. 7 best illustrates one of the differences between junction box 10 and junction box 100: in junction box 100, the driver 12 is not secured to the bottom. Rather, the bottom of junction box 100 actually has a central opening 128, similar to the central opening 110 in the cover 104. This configuration, in addition to saving material and making junction box 100 easy to assemble by securing two compartments 102 together end-to-end, may increase airflow to the driver. It may also be helpful with drivers that already have a high ingress protection rating, and thus, do not require much additional ingress protection from the junction box. For fire protection purposes, however, it may be helpful to see that the junction box 100 is dimensioned such that the driver 12 fits snugly against both the cover 104 and the bottom, so that there are no gaps.

Figure 8:
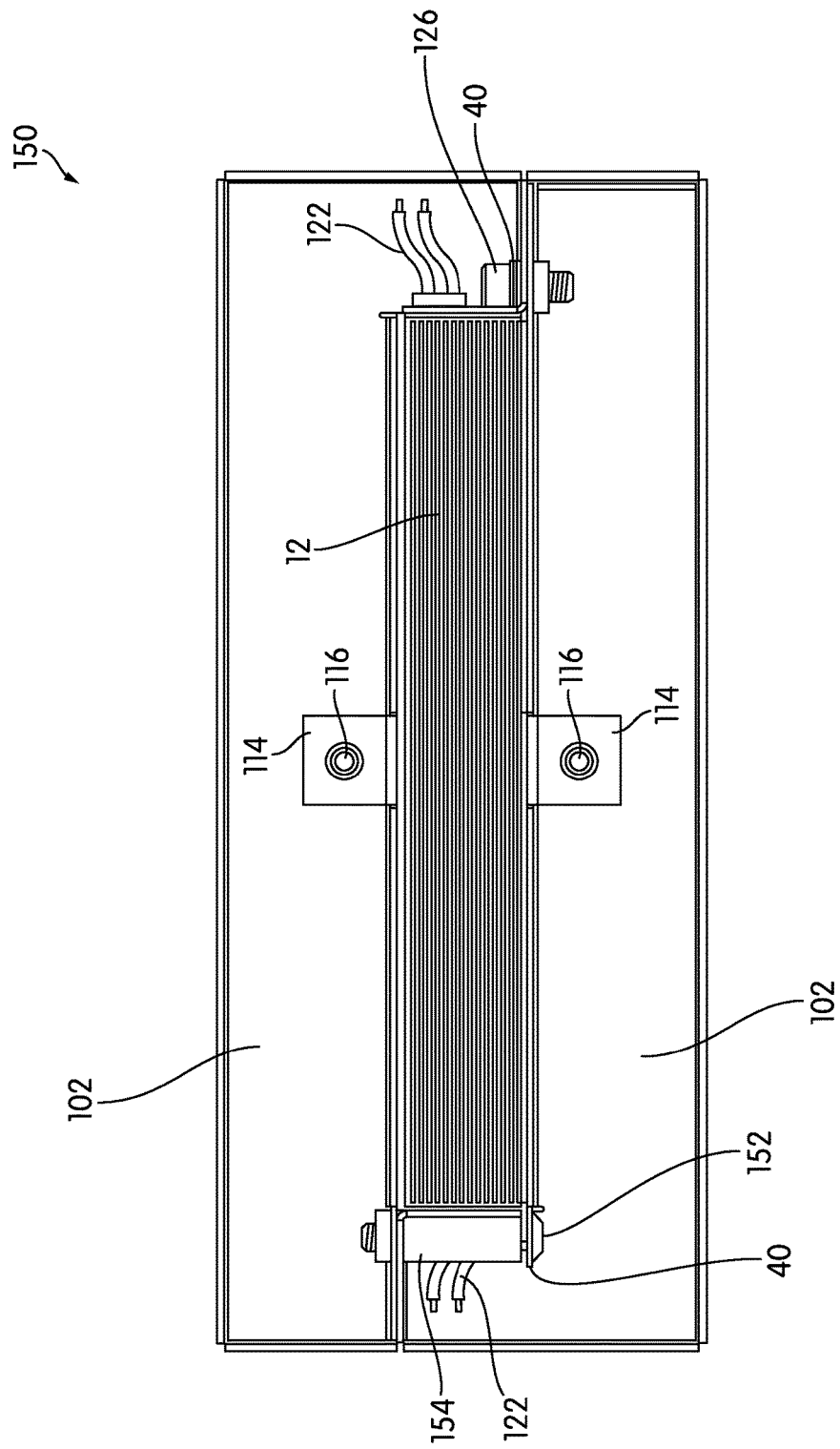
FIG. 8 is a top plan view of a junction box similar to the junction box of FIG. 4 showing additional means of securing the driver.

In some cases, additional structure may be needed to secure the driver 12 within the junction box 100. As one example, of additional means that may be taken to secure a driver 12 within a junction box, FIG. 8 is a top plan view of a junction box 150 that is similar to the junction box 100 described above in many respects. On one side, a screw 126 is inserted over the flange 40 of the driver 12 and transits the dividing wall between the two compartments 102, just as in the junction box 100 described above. However, unlike in junction box 100, in junction box 150, the other side of the driver 12 is also secured. Specifically, the driver 12 is secured by a screw or bolt 152, but since the location of the nearest wall of junction box 152 is opposite that of the other side, the bolt 152 is inserted from the other side, such that the head of the screw or bolt 152 bears against the underside of the flange 40. The screw or bolt 152 is considerably longer than its counterpart 126 on the other side, and it goes through a stand-off or sleeve 154 that extends between the flange 40 of the driver 12 and the wall between the two compartments 102. The stand-off or sleeve 154 provides a bearing surface for the screw or bolt 152 and allows it to be secured.

Thus, junction boxes 10, 100, 150 with wrap-around compartments of various shapes may be used in embodiments of the invention. However, it should also be understood that the walls that divide a junction box into those wrap-around compartments may be defined in various ways and may be carried by different components of the junction box in different embodiments.

Figure 9:
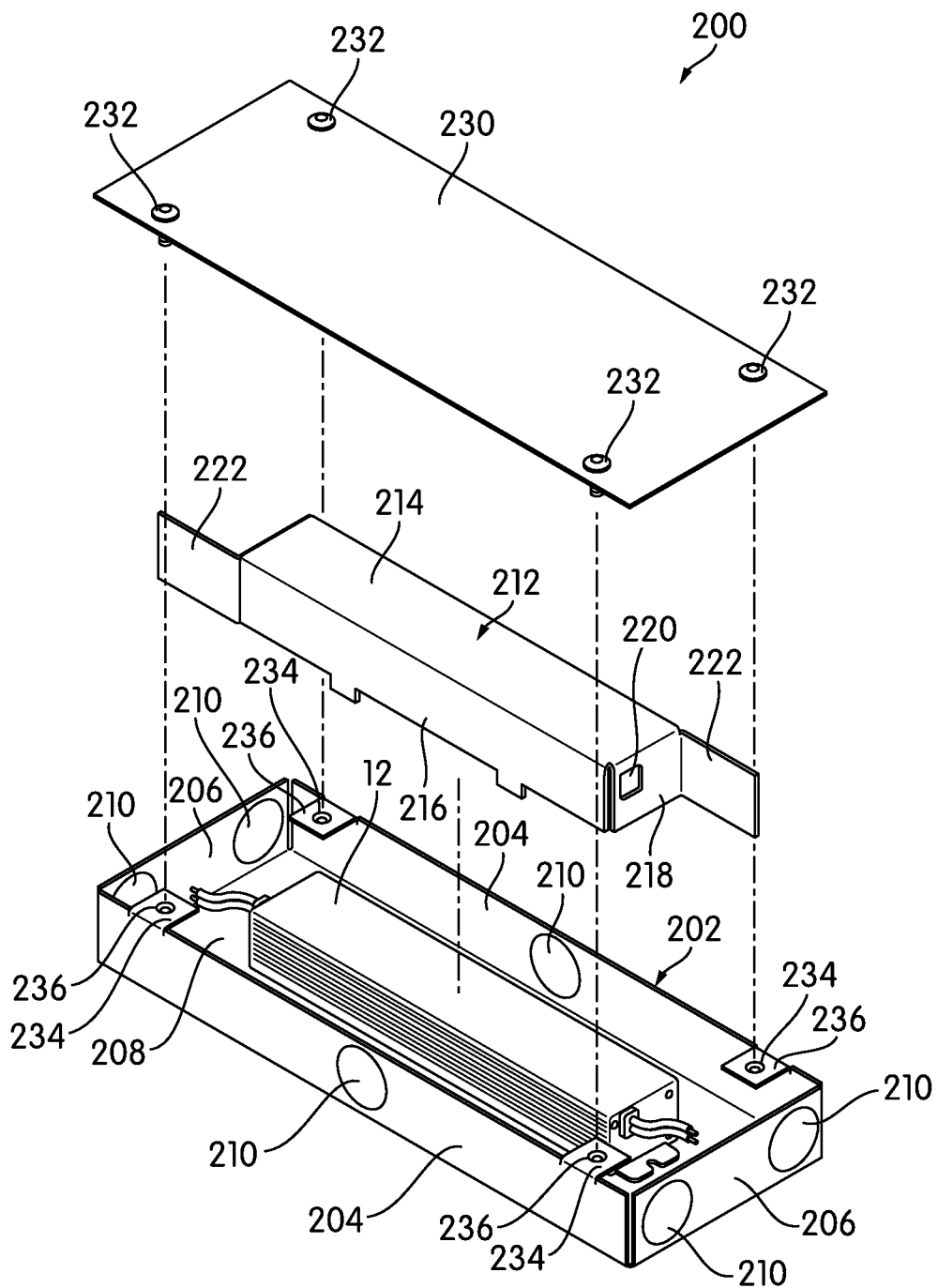
FIG. 9 is an exploded perspective view of a junction box according to yet another embodiment of the invention.

As an example of this, FIG. 9 is an exploded perspective view of a junction box, generally indicated at 200, according to yet another embodiment of the invention. Junction box 200 of FIG. 9 has wrap-around compartments, but those compartments are defined in a completely different way than in the embodiments described above.

Junction box 200 has a base 202, which is a five-sided rectilinear enclosure with pairs of long and short sidewalls 204, 206 and a bottom 208 from which the sidewalls 204, 206 arise. The configuration of the base 202 is such that it may be molded, cast, or bent out of sheet metal, to give but a few examples. Notably, the base 202 itself has no internal partitions—it is simply a large area surrounded by sidewalls 204, 206. The base 202 does have a series of knock-outs 210, one in each long wall 204 and two in each short wall 206. The predefined positions of the knock-outs 210 anticipate the locations of the compartments. As will be explained below in more detail, because the base 202 has no internal partitions of its own, the partitions that create compartments are carried by other components of the junction box 200.

Junction box 200 also includes a driver cap 212. The driver cap 212 is another five-sided rectilinear enclosure in the illustrated embodiment that has a top 212 and long and short sidewalls 216, 218 that are connected to, and extend downwardly from, the top 212. The driver cap 212 is intended to fit directly over the driver 12 and is sized and otherwise adapted to do so. In the illustrated embodiment, the driver cap 212 is made from folded sheet metal, and the long and short sidewalls 216, 218 are folded-down flaps of metal that depend from the top 212. Of course, as with the other components, the driver cap 212 may be made in any number of ways, e.g., by casting, machining, injection molding, etc. Each of the short sidewalls 218 has an opening 220 to permit the passage of wires from the driver 12.

Depending on the embodiment, the driver cap 212 may be dimensioned to fit the driver 12 almost exactly, or there may be some extra space in at least one dimension. For example, while it may be helpful for the driver cap 212 to have a similar length and width as the driver 12 that it secures, the driver cap 212 may have additional height relative to the driver 12.

Each long sidewall 216 carries a partition portion 222. Each partition portion 222 extends outwardly from the driver cap 212 in generally the same direction as the long sidewall 216. In the embodiment of FIG. 9, there are two partition portions 222, one associated with and extending in generally the same direction as each long sidewall 216. The two partition portions 222 are essentially at opposite corners of the driver cap 212 from one another, and extend in opposite directions from one another. When the driver cap 212 is installed in the base 202, the sidewalls 216, 218 and the partition portions 222 define two L-shaped compartments in cooperation with the sidewalls 206, 208 of the base 202. More specifically, the partition portions 222 are sized so that they extend the distance between the driver cap 212 and the short sidewalls 206 of the base 202, so that the driver cap 212 with its partition portions 222 completely partitions two L-shaped wrap-around compartments 224. In the illustrated embodiment, the partition portions 222 are straight extensions of their respective sidewalls 216, 218, although they may be bent or curved in other embodiments.

Figure 10:
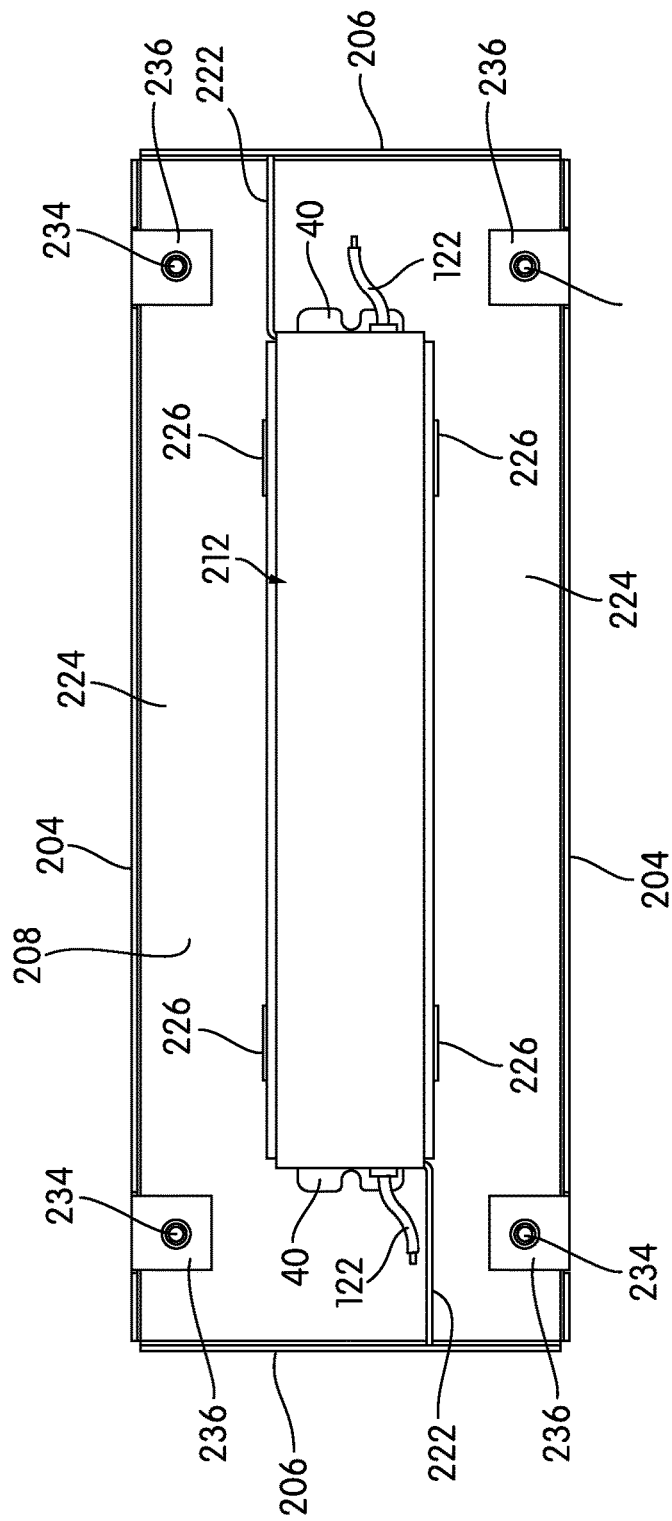
FIG. 10 is a top plan view of the junction box of FIG. 9 with the cover removed.

The compartments 224 that are created by the driver cap 212 in cooperation with the base 202 are best seen in FIG. 10, a top plan view of the junction box 200 without the cover installed. As was described briefly above, the partition portions 222 divide the base 202 into two L-shaped compartments 224 which, like the L-shaped compartments of junction box 100, are arranged long end to short end. The cap 212 rests on the flanges 40 of the driver 12 to secure the driver itself. Slots 226 in the bottom of the base 202 receive depending tabs 228 that extend down from the bottom edge of the driver cap 212, thereby securing the driver cap 212 in place. The driver cap 212 is also secured in place by the cover 230 of the junction box 200, which in the illustrated embodiment is itself secured in place by four screws or bolts 232 that pass through openings in the cover 230 and are received by threaded holes 234 in four horizontal, inwardly-extending flanges 236 provided along the top of the long sidewalls 204 of the base 202.

For ease and convenience in manufacturing, the partition portions 222 may be formed or attached in a variety of ways. For example, in the illustrated embodiment, although the partition portions 222 serve essentially as extensions of the long sidewalls 216 of the driver cap 212, each partition portion 222 is actually a flap of material that is contiguous with the adjacent short sidewall 218 of the driver cap 212 and is bent to extend in the same direction as the long sidewall 216. Thus, in the illustrated embodiment, the partition portions 222 are contiguous with the respective short sidewalls 218, rather than the long sidewalls 216. Regardless of the precise points of attachment of the partition portions 222, in cooperation with the base 202, the driver cap 212 as a whole provides a continuous barrier between compartments 224, of which both the long sidewalls 216 and short sidewalls 218 form a part.

FIGS. 11 and 12 are end and side elevational views of the junction box 200, illustrating the locations of the knock-outs 210 in the sidewalls 204, 206. In FIG. 11, the position of a partition portion 222 is shown in phantom. As shown, the knock-outs 210 are arranged such that each compartment has a knock-out 210 along each short wall 206, and each compartment has a knock-out 210 along each long wall. This gives installers choices as to where the wires are to enter and leave the junction box 200.

Figure 13:
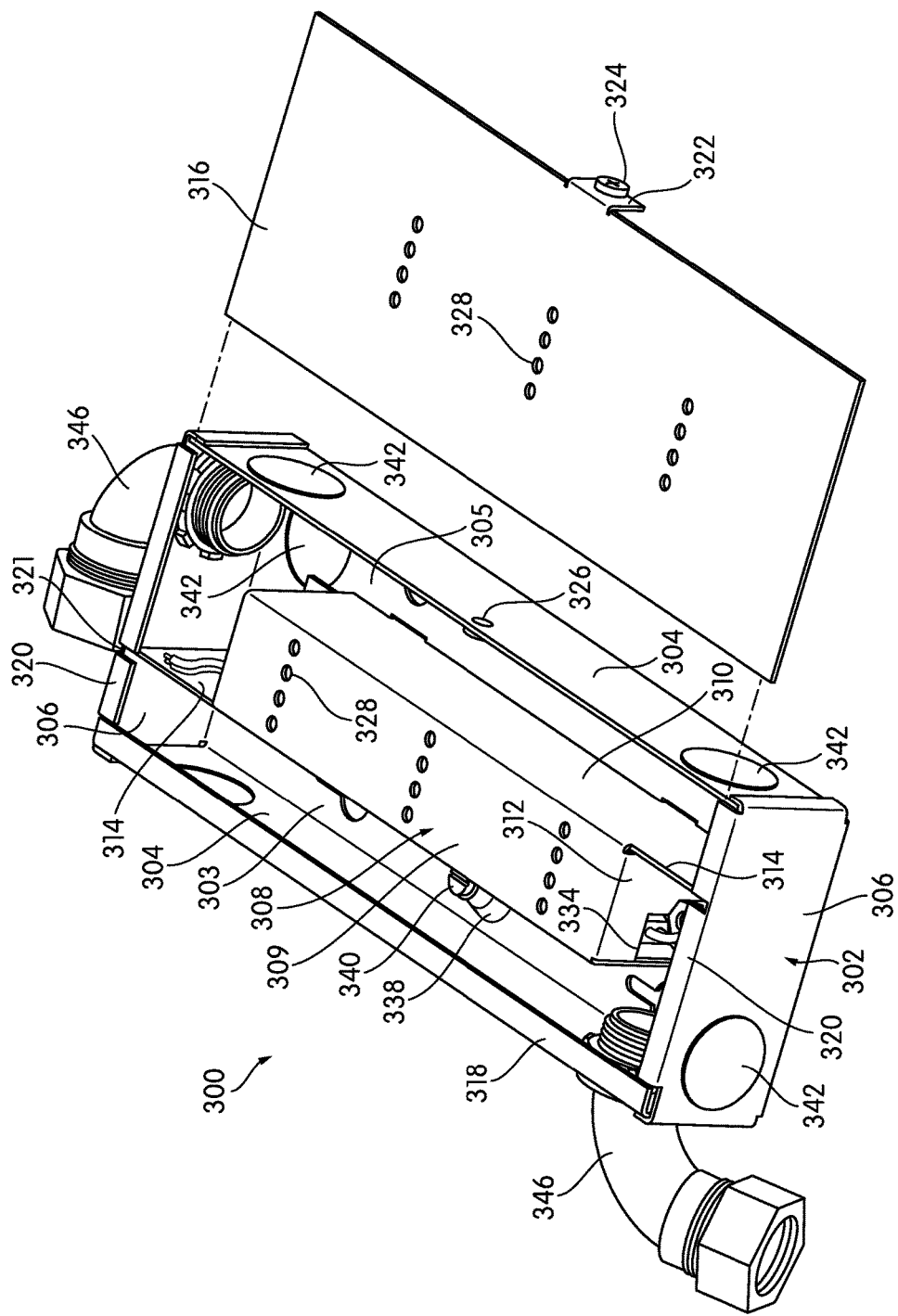
FIG. 13 is an exploded perspective view of a junction box according to yet another embodiment of the invention.

FIG. 13 is an exploded perspective view of a junction box, generally indicated at 300, according to yet another embodiment of the invention. Junction box 300 is similar in many respects to the junction box 200 described above; thus, elements not described here may be assumed to be the same as, or similar to, the corresponding components of junction box 200.

Junction box 300 has a base 302 that forms a five-sided enclosure with long sidewalls 304 and short sidewalls 306. The base 302 is open and does not have any internal partitions. As with junction box 200, a driver cap 308 has a top 309 and depending long and short sidewalls 310, 312 and covers the driver 12 along its top and sides. The driver cap 308 carries partition portions 314 that are arranged much as the partition portions 222 in junction box 200 are arranged. Along with the driver cap 308, the partition portions 314 divide the base 302 into two L-shaped compartments 303, 305.

Junction box 300 differs in several respects from the junction box 200 described above. For example, the cover 316 attaches to the base 302 differently. More specifically, one of the long sidewalls 304 of the base 302 and both short sidewalls 306 have inwardly-extending horizontal lips 318, 320 that collectively form a small channel along three sides of the junction box 300. (The lips 320 on the short sidewalls 306 have breaks 321 that allow for the insertion of the driver cap 308.) The cover 316 has a thickness that is dimensioned to fit within the channel, and slides into it. Along its front edge, the cover 316 has a bent-down vertical flange 322. The flange 322 carries a single screw 324, which inserts into a corresponding threaded hole 326 in the forward long sidewall 304 of the base 302. The screw 324 is captured by the flange 322; it can turn, but it cannot come free of the flange 322. Both the cover 316 and the driver cap 308 have ventilation holes 328 to increase airflow to the driver 12.

Figure 14:
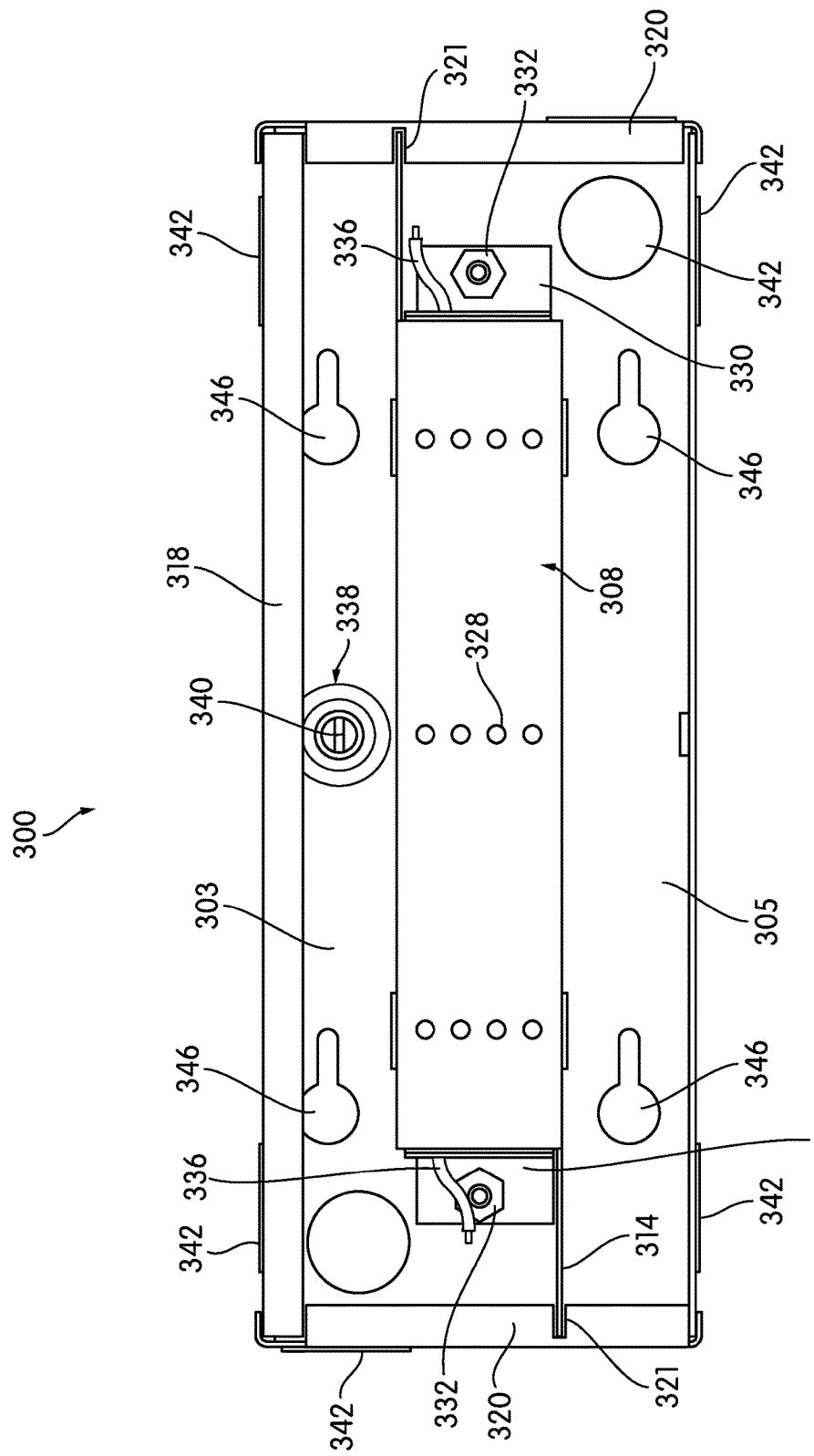
FIG. 14 is a top plan view of the junction box of FIG. 13 with the cover removed.

FIG. 14 is a top plan view of junction box 300 with the cover 316 removed. Compared with junction box 200, the driver cap 308 of junction box 300 has elongated horizontal flanges 330 contiguous with the bottoms of the short sidewalls 312 of the driver cap 308. These long horizontal flanges 330 extend over the flanges 40 on the driver 12 and are secured down by screws, bolts, coupling nuts, or other such fasteners 332. In some cases, the fasteners 332 may serve as grounding terminals for ground wires.

As with driver cap 212, driver cap 308 includes openings 334 in its short sidewalls 312 to allow the wires 122 from the driver 40 to pass. In order to make it easier to place the driver 12 within the driver cap 308, a slot 336 extends down from each opening 334, so that the wires 122 from the driver 12 can be slid in instead of being threaded through the opening 334. As shown in FIG. 14, the slots 336 may extend down into the flanges 330.

High-voltage wiring entering the junction box 300 typically includes a high-voltage wire, a neutral wire, and a ground wire. The driver 12 itself typically includes at least a high-voltage wire and a neutral wire and may or may not include its own separate ground wire. For various reasons, it may be necessary or desirable to connect the junction box 300 itself to ground. Thus, junction box 300 includes a grounding terminal 338 in the floor of one compartment 303. The grounding terminal 338 is a raised feature or mound that arises from the floor of the compartment 303. At the center of the grounding terminal 338, a screw 340 is provided, under which a grounding wire can be secured. The screw 340 may be captured in the grounding terminal 338 so that it can turn but cannot come free of the grounding terminal 338. While there is a grounding terminal 338 in only one of the two compartments 303, 305, a grounding terminal may be added to the other compartment 305, if desired, in order to preserve symmetry.

Figure 15:
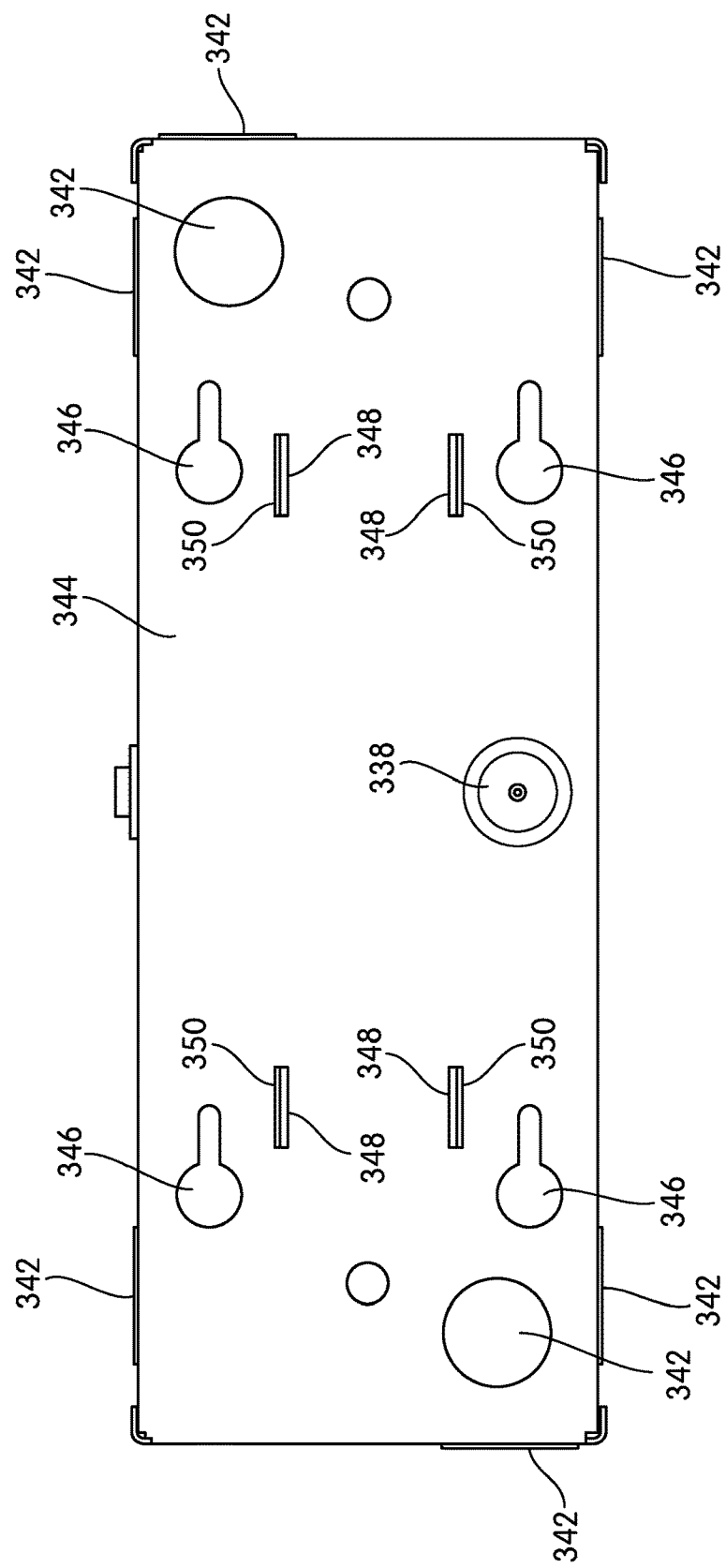
FIG. 15 is a bottom plan view of the junction box of FIG. 13.
Figure 16:
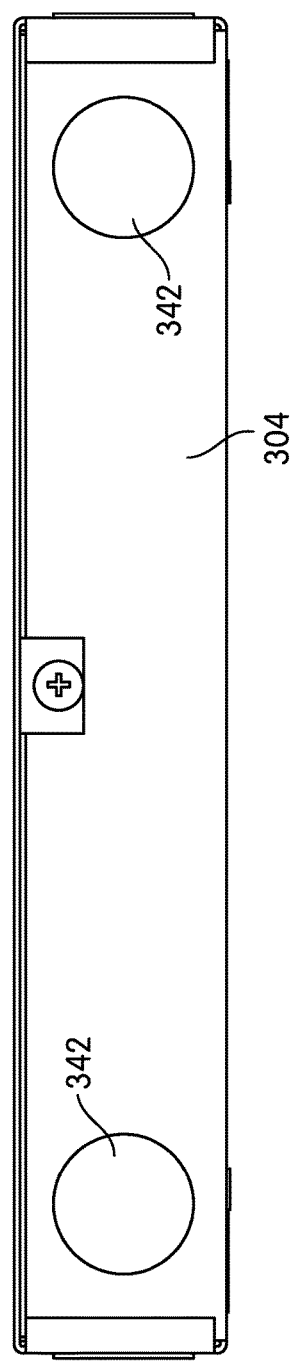
FIG. 16 is a long-side elevational view of the junction box of FIG. 13.
Figure 17:
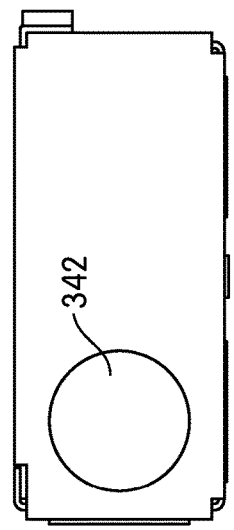
FIG. 17 is a short-side elevational view of the junction box of FIG. 13.

In junction box 300, the placement of knock-outs 342 is slightly different than in the junction boxes 10, 150, 200 described above. FIG. 15 is a bottom plan view of the junction box 300. The knock-outs 342 and resulting openings are best seen in FIGS. 13-15. Junction box 300 has two knock-outs 342 along each long sidewall 304 and one knock-out 342 along each short sidewall 306. The knock-outs 342 are arranged such that on opposite corners, the knock-out 342 on the long sidewall 304 and the knock-out 342 on the short sidewall 306 are adjacent one another. However, in addition to the knock-outs 342 on the sidewalls 304, 306, as shown in FIG. 15, the junction box 300 includes two knock-outs 342 along the bottom 344, arranged one per compartment at opposite corners of the junction box 300. This allows a user to make connections through the bottom 344 of the junction box 300 as well as through the sides 304, 306. (FIG. 13 shows two rigid, 90° elbows 346 connected to the junction box 300.) FIGS. 16 and 17 are long-side elevational and short-side elevational views of the junction box 300, illustrating the placements of the knock-outs 342.

In addition to the knock-outs 342, junction boxes 10, 100, 150, 200, 300 according to embodiments of the invention may have mounting holes or, alternatively, mounting structures in any desired locations to facilitate mounting. The bottom 344 of the junction box 300 includes four keyhole-style mounting openings 346. As is well-known in the art, keyhole-style mounting openings 346 have a round portion that is large enough to pass a fastener head and a narrower slit portion that is not large enough to pass a fastener head.

FIG. 15 also illustrates the position of the slots 348 in the bottom 344 of the base 302 that receive the depending projections 350 from the driver cap 308. Because the driver cap 308 is secured with screws or other fasteners 332 that extend through its flanges 330, the slots 348 and projections 350 primarily serve a locating function in the junction box 300.

Figure 18:
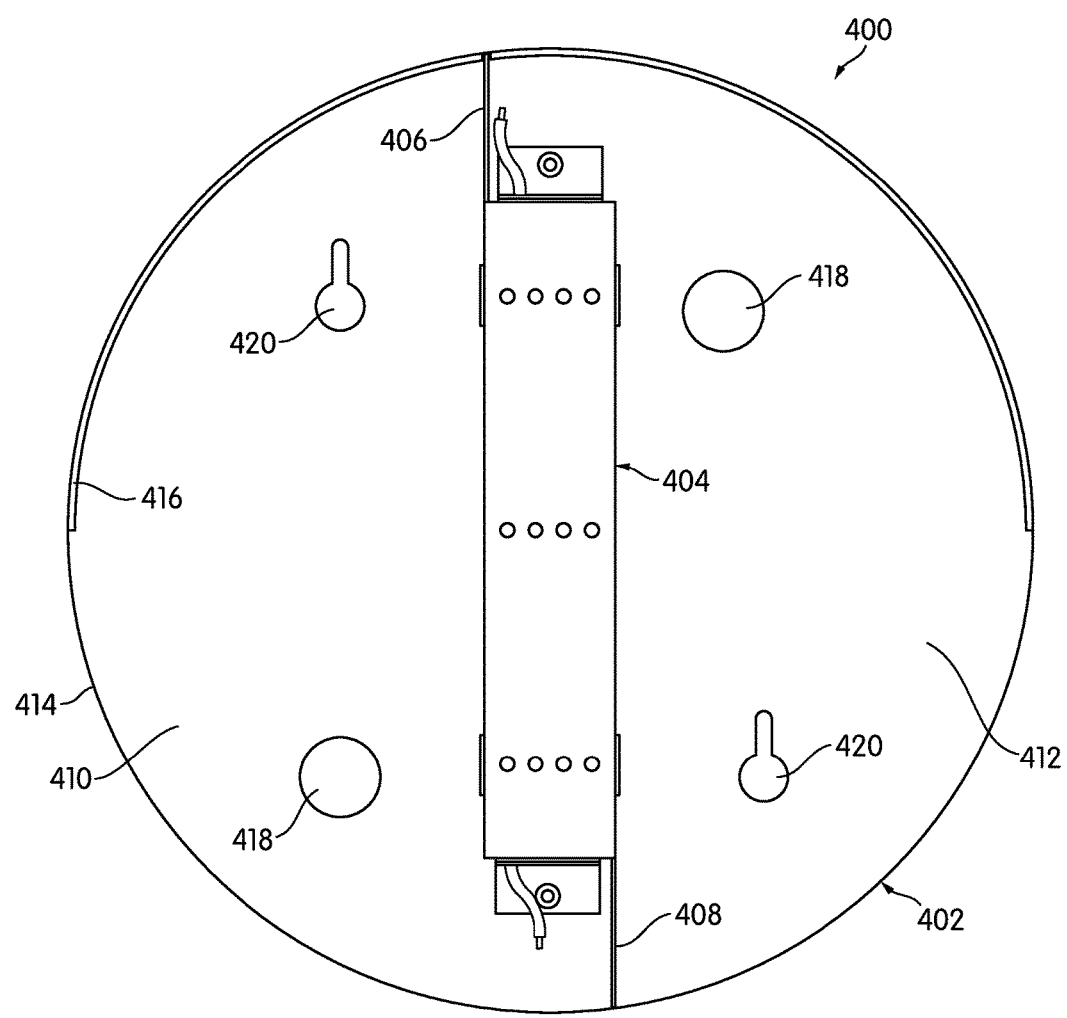
FIG. 18 is a top plan view of a junction box according to a further embodiment of the invention.

FIG. 18 is a top plan view of a junction box, generally indicated at 400, according to a further embodiment of the invention. All of the junction boxes 10, 100, 150, 200, 300 described above are rectilinear, but that need not be the case in all embodiments. Junction box 400 is round, but could be oval, triangular, or essentially any other shape. The view of FIG. 18 shows the base 402 of junction box 400 only; the cover is omitted, but may be assumed to be similar, except in shape, to the cover 316 of junction box 300.

Like the junction boxes 200, 300 described above, the base 402 of junction box 400 alone is undivided; the base 402 has no internal partitions of its own. Junction box 400 is divided by a driver cap 404 and its partition portions 406, 408 into two wrap-around compartments 410, 412. The partition portions 406, 408 themselves may be of different sizes and have different bends or contours, if necessary, in order to meet the round sidewall 414 of the junction box 400. In the illustrated embodiment, approximately half of the upper circumference of the sidewall 414 has a lip 416, which forms a channel to secure a cover, much like in junction box 300. However, the cover of junction box 400 may be secured in any number of ways. Like the others, junction box 400 may have any number of knock-outs 418 along its sidewalls or bottom. In the view of FIG. 18, two knock-outs 418 are provided in the bottom, one in each compartment 410, 412; other knock-outs 418 may be provided in sections of the sidewall 414 but are not shown in the view of FIG. 18. Junction box 400 also includes keyhole-style mounting openings 420 arranged diagonally with respect to one another on the bottom, one per compartment 410, 412.

One advantage of driver caps 212, 308, 404 that carry their own partitions is that a driver cap 212, 308, 404 could potentially be retrofit to a standard round or square general-purpose electrical junction box to define high- and low-voltage compartments. This could potentially allow any standard electrical junction box to carry an appropriately-sized driver, encased within a driver cap 212, 308, 404 that creates the necessary compartments for high voltage and low voltage within the junction box. That driver cap may be secured to the junction box by any suitable means, including screws or bolts; if no suitable holes or openings are provided for securing the driver cap 212, 308, 404, holes may simply be drilled in the junction box.

Thus, one embodiment of the invention relates to driver caps 212, 308, 404 with partition portions 222, 314, 406, 408 that are provided independently of any particular junction box or junction box base. In some cases, these driver caps 212, 308, 404 may be sold or otherwise provided with a driver 12 already installed. If so, all that an installer would need to do would be to place the driver-carrying driver cap 212, 308, 404 in a standard electrical junction box and secure it.

In the embodiments described above, a driver cap 212, 308, 404 is used to enclose the driver 12 and to create partitions. However, in many cases, fully enclosing the driver 12 within an already fully-enclosed junction box is not necessary. Rather, a five-sided driver cap 212, 308, 404 is used simply because it may be easier to manufacture. In some cases, though, it may be desirable to omit the top of the driver cap, so that the driver 12 is merely surrounded, and not covered.

Figure 19:
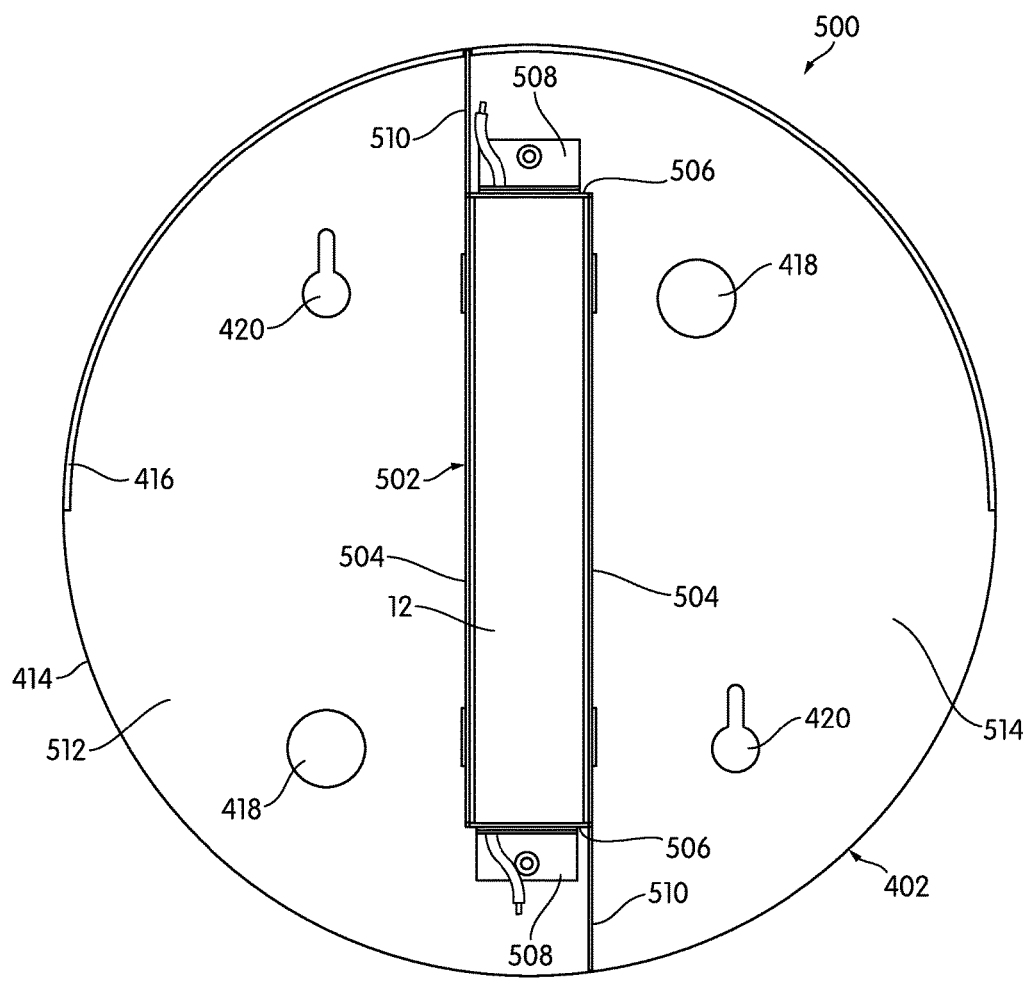
FIG. 19 is a top plan view of a junction box according to another further embodiment of the invention.

FIG. 19 is a top plan view of a junction box, generally indicated at 500, that illustrates this principle. Junction box 500 has most of the features of junction box 400 and differs only in how the driver 12 is surrounded and how partitions are made. More specifically, the driver 12 is surrounded by a four-sided enclosure 502 with two long walls 504, two short walls 506, and no top. Thus, the driver 12 is exposed along its top face. The long and short walls 504, 506 would generally be as tall, or nearly as tall, as the sidewall 414 of junction box 500 in order to provide a complete partition. Like the driver caps 212, 308, 404, the enclosure 502 has flanges 508 that secure the driver 12, and includes partition portions 510 that extend outwardly from the enclosure 502 to partition junction box 500 into two wrap-around compartments 512, 514. As with the other embodiments, while the partition portions 510 are straight and in line with the long sidewalls 504 of the enclosure, they need not be in all embodiments.

The enclosure 502 may be made in any number of ways, including with sheet metal or by casting or molding, and it may be made of metal or plastic. If a driver cap 404 or enclosure 502 is added to a junction box 400, 500 as a retrofit, the driver cap 404 or enclosure 502 would typically be of at least the same type of material as the junction box 400, 500. For example, if the junction box 400, 500 is made of metal, the driver cap 404 or enclosure 502 would also be made of metal.

Thus, there are a number of ways in which junction boxes 10, 100, 150, 200, 300 may be made with wrap-around compartments of various shapes and sizes to accommodate a driver 12 and, potentially, minimize the size of the junction box 10, 100, 150, 200, 300 as compared with other ways of configuring the compartment spaces. There are also a number of ways in which a driver cap 212, 308, 404 or enclosure 502 may be used to retrofit an existing junction box 400, 500 to provide compartments when they are needed.

Although portions of this description focus on AC-to-DC drivers, junction boxes according to embodiments of the invention may house a variety of electronic equipment and need not be limited to AC-to-DC drivers. For example, a junction box may house an AC-to-AC transformer or converter. Junction boxes may also house other types of components, such as color controllers and network interfaces.

While the invention has been described with respect to certain embodiments, the description is intended to be exemplary, rather than limiting. Modifications and changes may be made within the scope of the invention, which is defined by the appended claims.

What is claimed is:

1. A junction box, comprising:
   a base having a bottom and a sidewall arising from the bottom;
   a driver cap, the driver cap having
      a top,
      sidewalls depending from the top, and
      partition portions extending outwardly from the sidewalls, the partition portions being arranged so as to extend to the sidewall of the base and thereby divide the base into at least two compartments that wrap around the driver cap; and
   a cover sized and adapted to engage the base and to form a closed enclosure with the base.

2. The junction box of claim 1, wherein the base is rectangular and the sidewall comprises opposed pairs of opposed long and short sidewalls.

3. The junction box of claim 1, wherein the driver cap comprises opposed pairs of long and short sidewalls.

4. The junction box of claim 3, wherein the partition portions extend from diagonally opposed corners of the driver cap.

5. The junction box of claim 4, wherein the partition portions extend in line with long axes of the long sidewalls of the driver cap.

6. The junction box of claim 1, wherein the driver cap further comprises at least one locating or engaging feature, and the base further comprises a complementary locating or engaging feature.

7. The junction box of claim 6, wherein the locating or engaging feature comprises sets of depending tabs and the complementary locating or engaging feature of the base comprises complementary sets of slots adapted for the sets of depending tabs.

8. A junction box, comprising:
   a base, the base including
      a bottom,
      a sidewall connected to the bottom and extending upwardly therefrom, and
      one or more sets of internal partitions arising from the bottom, the internal partitions dividing the base into a central compartment for a driver and at least one compartment that wraps around the central compartment, at least one knock-out or opening in the sidewall that coincides with the position of the at least one wrap-around compartment; and a cover adapted to be secured to the base to cover and close the junction box.

9. The junction box of claim 8, wherein the base comprises two sets of internal partitions that divide the base into the central compartment and two compartments that wrap around the central compartment.

10. The junction box of claim 9, wherein the two compartments that wrap around the central compartment are U-shaped.

11. The junction box of claim 9, wherein the two compartments that wrap around the central compartment are L-shaped.

12. The junction box of claim 9, wherein the base comprises at least two knock-outs or openings that coincide with the position of each of the two compartments.

13. The junction box of claim 9, wherein the base is rectangular and the sidewall comprises two long sidewalls and two short sidewalls, the long and short sidewalls extending perpendicular to one another, respectively, such that the perimeter of the sidewall is rectangular.

14. The junction box of claim 9, wherein each of the two sets of internal partitions has a cut-out that extends from the top of the internal partition downwardly.

15. The junction box of claim 14, wherein the cut-out is generally U-shaped.

16. A partition for a junction box, comprising:
a driver cap including
a top;
sidewalls depending from the top; and
partition portions extending outwardly from the sidewalls.

17. The partition of claim 16, wherein the sidewalls comprise two long and two short sidewalls arranged such that the driver cap has a generally rectangular perimeter.

18. The partition of claim 17, wherein the partition portions are oriented generally vertically and extend outwardly in generally the same direction as the sidewalls.

19. The partition of claim 18, wherein the partition portions are attached to the driver cap so as to extend from diagonally opposite corners thereof.

20. The partition of claim 19, further comprising at least one penetration allowing wires from a driver to leave the driver cap.

* * * * *